(12) United States Patent
Kim

(10) Patent No.: US 12,394,828 B2
(45) Date of Patent: Aug. 19, 2025

(54) CABLE-TYPE BATTERY

(71) Applicant: LG Chem, Ltd., Seoul (KR)

(72) Inventor: Hee-Gyu Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 584 days.

(21) Appl. No.: 16/496,194

(22) PCT Filed: Nov. 20, 2018

(86) PCT No.: PCT/KR2018/014295
§ 371 (c)(1),
(2) Date: Sep. 20, 2019

(87) PCT Pub. No.: WO2019/103437
PCT Pub. Date: May 31, 2019

(65) Prior Publication Data
US 2020/0161712 A1    May 21, 2020

(30) Foreign Application Priority Data
Nov. 22, 2017 (KR) .......................... 10-2017-0156287

(51) Int. Cl.
*H01M 10/42* (2006.01)
*H01M 10/04* (2006.01)
(Continued)

(52) U.S. Cl.
CPC ..... *H01M 10/425* (2013.01); *H01M 10/0422* (2013.01); *H01M 10/0525* (2013.01);
(Continued)

(58) Field of Classification Search
CPC .................................................. H01M 10/425
See application file for complete search history.

(56) References Cited

U.S. PATENT DOCUMENTS

| 2009/0186268 A1* | 7/2009 | Song | H01M 10/0436 |
| | | | 429/163 |
| 2011/0129694 A1* | 6/2011 | Baek | H01M 50/147 |
| | | | 429/7 |

(Continued)

FOREIGN PATENT DOCUMENTS

| CN | 103891027 A | 6/2014 |
| CN | 104025338 A | 9/2014 |

(Continued)

OTHER PUBLICATIONS

TW200536168A translation (Year: 2005).*
(Continued)

*Primary Examiner* — Helen Oi K Conley
*Assistant Examiner* — Amanda Rosenbaum
(74) *Attorney, Agent, or Firm* — Lerner David LLP

(57) ABSTRACT

A cable-type battery includes a cable-type battery cell including at least one internal electrode layer having an internal electrode active material formed on a surface of an internal current collector extending in a longitudinal direction to have a cross section of a preset shape, a separation layer formed to surround the at least one internal electrode layer, and an external electrode layer formed to surround the separation layer and having an external electrode active material formed on a surface of an external current collector; and a protection circuit module electrically connected to the battery cell to protect the battery cell.

6 Claims, 4 Drawing Sheets

(a)

(b)

(51) Int. Cl.
*H01M 10/0525* (2010.01)
*H01M 50/572* (2021.01)

(52) U.S. Cl.
CPC .. *H01M 50/572* (2021.01); *H01M 2010/4271* (2013.01); *H01M 2220/30* (2013.01)

(56) References Cited

U.S. PATENT DOCUMENTS

| | | | |
|---|---|---|---|
| 2011/0151285 A1* | 6/2011 | Hong | H01M 10/42 |
| | | | 29/878 |
| 2012/0107658 A1* | 5/2012 | Kwon | H01M 4/75 |
| | | | 429/94 |
| 2012/0214027 A1 | 8/2012 | Ahn | |
| 2013/0059171 A1 | 3/2013 | Kim et al. | |
| 2013/0257348 A1 | 10/2013 | Baluha | |
| 2013/0344363 A1 | 12/2013 | Upadhyaya | |
| 2014/0170456 A1 | 6/2014 | Kwon et al. | |
| 2014/0234672 A1* | 8/2014 | Kwon | H01M 10/0422 |
| | | | 429/7 |
| 2014/0272506 A1* | 9/2014 | Kwon | H01M 10/0431 |
| | | | 429/94 |
| 2014/0363702 A1 | 12/2014 | Kim | |
| 2014/0370347 A1 | 12/2014 | Jung et al. | |
| 2014/0377613 A1 | 12/2014 | Kwon et al. | |
| 2015/0155545 A1* | 6/2015 | Baek | H01M 10/4257 |
| | | | 429/7 |
| 2015/0162650 A1 | 6/2015 | Ahn et al. | |
| 2015/0304757 A1 | 10/2015 | Kim et al. | |
| 2017/0040582 A1 | 2/2017 | Kim | |
| 2017/0117573 A1 | 4/2017 | Upadhyaya | |
| 2017/0250448 A1 | 8/2017 | Kwon et al. | |
| 2017/0256755 A1 | 9/2017 | Yang | |
| 2018/0090739 A1 | 3/2018 | Kim | |
| 2018/0159225 A1 | 6/2018 | Bourilkov et al. | |
| 2019/0033602 A1 | 1/2019 | Lee et al. | |

FOREIGN PATENT DOCUMENTS

| | | |
|---|---|---|
| CN | 204205627 U | 3/2015 |
| CN | 204375848 U | 6/2015 |
| CN | 205377348 U | 7/2016 |
| JP | 2004362873 A | 12/2004 |
| JP | 2008117653 A | 5/2008 |
| JP | 2010067524 A | 3/2010 |
| JP | 2012174689 A | 9/2012 |
| JP | 2015002173 A | 1/2015 |
| JP | 2015518641 A | 7/2015 |
| JP | 2016530742 A | 9/2016 |
| JP | 2017537437 A | 12/2017 |
| JP | 2018519650 A | 7/2018 |
| KR | 20050099903 A | 10/2005 |
| KR | 20060103693 A | 10/2006 |
| KR | 20130025165 A | 3/2013 |
| KR | 20130006884 U * | 12/2013 |
| KR | 20140142978 A | 12/2014 |
| KR | 20150049849 A | 5/2015 |
| KR | 20150065280 A | 6/2015 |
| KR | 20150065498 A | 6/2015 |
| KR | 101650444 B1 | 8/2016 |
| KR | 20170017131 A | 2/2017 |
| KR | 20170072703 A | 6/2017 |
| KR | 20170084703 A | 7/2017 |
| KR | 101795542 B1 | 12/2017 |
| TW | 200536168 A * | 11/2005 |
| WO | 2005098994 A1 | 10/2005 |
| WO | 2013086508 A1 | 6/2013 |
| WO | 2016204587 A1 | 12/2016 |
| WO | 2020013548 A1 | 1/2020 |

OTHER PUBLICATIONS

International Search Report from Application No. PCT/KR2018/014295 mailed Mar. 27, 2019, pp. 1-2.
Japanese Search Report for Application No. 2019-552507 dated Sep. 8, 2020, 11 pages.
Extended European Search Report with Written Opinion for Application No. 18881382.8 dated Jul. 14, 2020, 9 pages.
Search Report dated Dec. 24, 2021 from the Office Action for Chinese Application No. 201880015308.X issued Jan. 5, 2022, 4 pages.
Search Report dated May 25, 2022 from the Office Action for Chinese Application No. 201880015308.X issued May 31, 2022, 2 pages.

* cited by examiner (a)

(b)

CABLE-TYPE BATTERY

CROSS-REFERENCE TO RELATED APPLICATIONS

The present application is a national phase entry under 35 U.S.C. § 371 of International Application No. PCT/KR2018/014295, filed Nov. 20, 2018, published in Korean, which claims priority to Korean Patent Application No. 10-2017-0156287 filed on Nov. 22, 2017 in the Republic of Korea, the disclosures of which are incorporated herein by reference.

TECHNICAL FIELD

The present disclosure relates to a cable-type battery, and more particularly, to a cable-type battery capable of protecting a battery cell from overcharge or overdischarge.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes a secondary battery cell in which a positive electrode plate and a negative electrode plate, respectively coated with the positive electrode active material and the negative electrode active material, are arranged with a separator therebetween, and an outer member, that is a battery case, which seals and receives the secondary battery cell together with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

Most secondary batteries currently used in the art are cylindrical, rectangular or pouch-type secondary batteries. The secondary batteries are classified into a pouch type, a cylindrical type and a rectangular type depending on the kind of an exterior material. The secondary batteries are manufactured by mounting an electrode assembly having a negative electrode, a positive electrode and a separator into cylindrical or rectangular metal can or a pouch-type case, which is an aluminum laminate sheet, and then injecting an electrolyte into the electrode assembly. For this reason, the secondary batteries may be easily manufactured with a low cost. However, a certain space for mounting the secondary batteries is essentially required, and the deformation of the shape is limited. Thus, the cylindrical, rectangular or pouch-type secondary batteries may give a restriction in developing various types of portable devices.

Accordingly, there is a demand for a secondary battery of a new form which is easy to deform in shape. In connection with this requirement, a cable-type secondary battery, which is a secondary battery having a very long length compared to a cross-sectional diameter, has been proposed. The main feature of the cable-type secondary battery is that it has an elongated shape stretchable in the longitudinal direction, namely a so-called cable structure. However, a conventional secondary battery formed to have a long length has a problem in that the battery cell may not be adequately protected from overcharge or overdischarge of the battery cell.

DISCLOSURE

Technical Problem

Therefore, the present disclosure is directed to providing a cable-type battery, which may protect a battery cell from overcharge or overdischarge.

Also, the present disclosure is directed to providing a cable-type battery, which may allow a protection circuit module to be insulated, waterproof and dustproof.

In addition, the present disclosure is directed to providing a cable-type battery, which may protect a battery cell from an external impact.

Technical Solution

In one aspect of the present disclosure, there is provided a cable-type battery, comprising: a cable-type battery cell including at least one internal electrode layer having an internal electrode active material formed on a surface of an internal current collector extending in a longitudinal direction to have a cross section of a preset shape, a separation layer formed to surround the at least one internal electrode layer, and an external electrode layer formed to surround the separation layer and having an external electrode active material formed on a surface of an external current collector; and a protection circuit module electrically connected to the battery cell to protect the battery cell.

Also, the battery cell may be formed to be flexible.

In addition, the protection circuit module may include an end-connecting protection circuit module, and the end-connecting protection circuit module may be connected to one end of the battery cell.

Also, the cable-type battery may further comprise an insulation member configured to surround the end-connecting protection circuit module.

In addition, the insulation member may be a hot melt.

Also, the protection circuit module may include an accommodating protection circuit module, and the accommodating protection circuit module may be provided to accommodate the battery cell.

In addition, the accommodating protection circuit module may be provided as a flexible board to surround a periphery of the battery cell.

Also, a circuit component may be mounted to an inside of the accommodating protection circuit module.

Meanwhile, in another aspect of the present disclosure, there is also provided a battery pack, which includes the cable-type battery, and there is also provided a device, which includes the cable-type battery.

Advantageous Effects

According to the embodiments of the present disclosure, it is possible to protect a battery cell from overcharge or overdischarge by using the protection circuit module connected to the battery cell.

Also, it is possible to allow the protection circuit module to be insulated, waterproof and dustproof by using the insulation member coupled to the protection circuit module.

In addition, it is possible to protect a battery cell from an external impact since the protection circuit module is provided to surround a periphery of the battery cell.

BEST MODE

Figure 1:
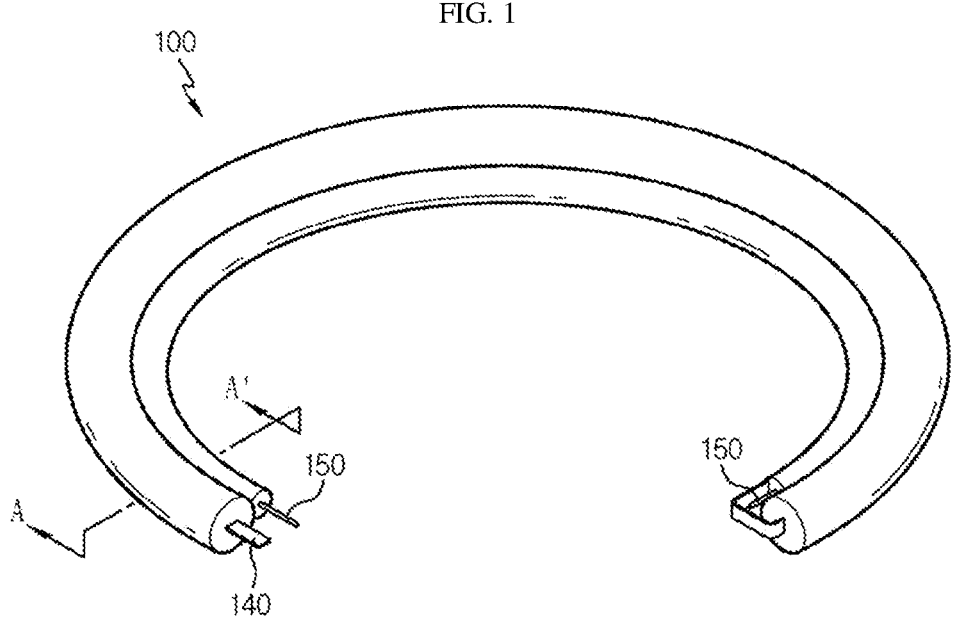
FIG. 1 is a perspective schematic view showing a cable-type battery cell employed at a cable-type battery according to the first embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 2:
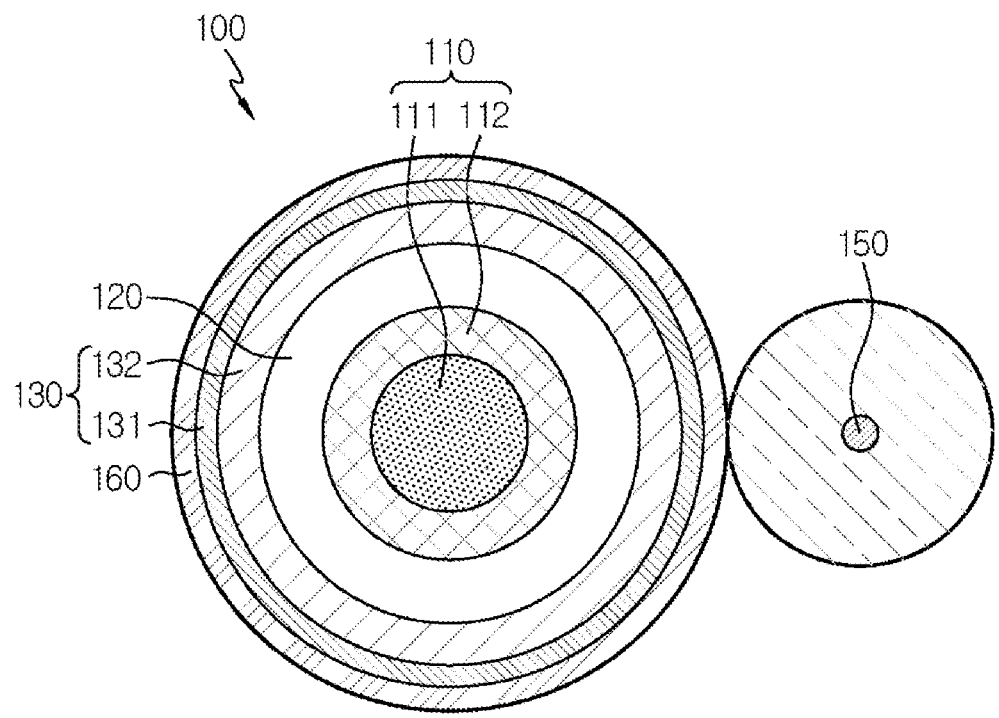
FIG. 2 is a cross-sectioned view showing the battery cell, taken along the line A-A' of FIG. 1.
Figure 3:
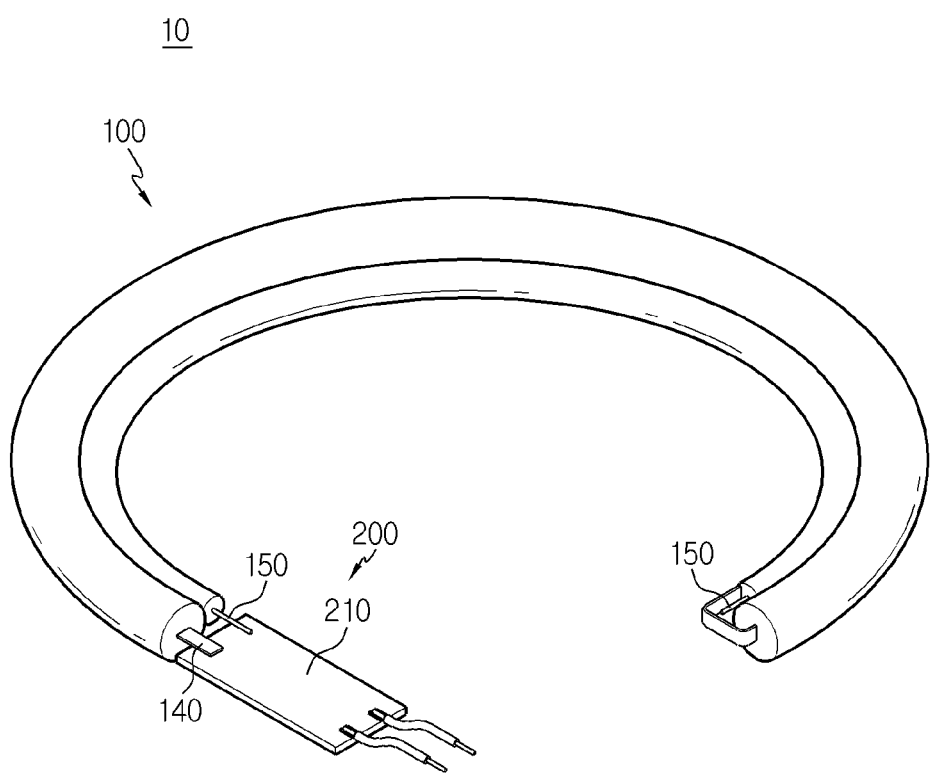
FIG. 3 is a schematic perspective view showing that a protection circuit module is coupled to the cable-type battery according to the first embodiment of the present disclosure.
Figure 4:
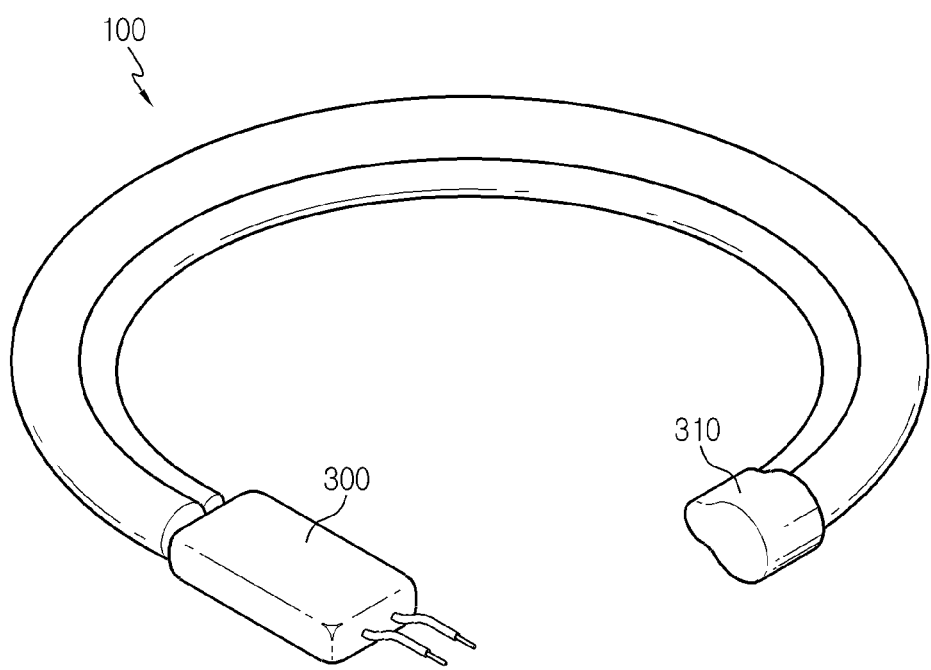
FIG. 4 is a schematic perspective view showing that an insulation member is coupled to the protection circuit module of FIG. 3.

FIG. 1 is a perspective schematic view showing a cable-type battery cell employed at a cable-type battery according to the first embodiment of the present disclosure, FIG. 2 is a cross-sectioned view showing the battery cell, taken along the line A-A' of FIG. 1, FIG. 3 is a schematic perspective view showing that a protection circuit module is coupled to the cable-type battery according to the first embodiment of the present disclosure, and FIG. 4 is a schematic perspective view showing that an insulation member is coupled to the protection circuit module of FIG. 3.

Referring to FIGS. 1 to 3, a cable-type battery 10 according to the first embodiment of the present disclosure includes a cable-type battery cell 100 and a protection circuit module 200. Here, the cable-type battery cell 100 is a battery cell 100 having a large length compared to a cross-sectional diameter. Hereinafter, the battery cell 100 means a cable-type battery cell 100 elongated in a longitudinal direction.

The battery cell 100 may convert electrical energy supplied from the outside into chemical energy, store the converted chemical energy, convert the stored chemical energy into electrical energy, and supply the converted electric energy to the outside. The battery cell 100 may have a first wire 140 connected to a positive electrode terminal or a negative electrode terminal, and a second wire 150 may also be coupled to the battery cell 100 to be connected to a negative electrode terminal or a positive electrode terminal.

Referring to FIG. 2, the battery cell 100 includes an internal electrode layer 110, a separation layer 120, and an external electrode layer 130.

The internal electrode layer 110 includes an internal current collector 111 and an internal electrode active material 112 so that the internal electrode active material 112 is formed on a surface of the internal current collector 111 having a horizontal cross section of a preset shape. Here, the preset shape means that the shape is not particularly limited, and any shape may be used as long as the shape does not impair the essence of the present disclosure. The horizontal cross section of the internal current collector 111 may be circular or polygonal. Here, the circular structure includes a geometrically complete symmetrical circular and an asymmetric elliptical structure. The polygonal structure is not particularly limited, and the polygonal structure may be, for example, a triangle, a rectangle, a pentagon, or a hexagon. However, a pipe-type current collector, a wound wire-type current collector, or a wound sheet-type or mesh-type current collector may also be used during manufacturing. In addition, the internal electrode layer 110 may be a negative electrode or a positive electrode.

The separation layer 120 is formed to surround the internal electrode layer 110 at an outer surface of the internal electrode layer 110. The separation layer 120 includes an electrolyte that serves as a passage of ions. In addition, the external electrode layer 130 is formed on an outer surface of the separation layer 120 to surround the separation layer 120.

The external electrode layer 130 includes an external current collector 131 and an external electrode active material 132 so that the external electrode active material 132 is formed on a surface of the external current collector 131. The external current collector 131 may also use a pipe-type current collector, a wound wire-type current collector, or a wound sheet-type or mesh-type current collector in the manufacturing process. In addition, the external electrode layer 130 may be a positive electrode or a negative electrode to correspond to the internal electrode layer 110. That is, if the internal electrode layer 110 is a positive electrode, the external electrode layer 130 is a negative electrode. Also, if the internal electrode layer 110 is a negative electrode, the external electrode layer 130 is a positive electrode.

The internal current collector 111 and the external current collector 131 play a role of collecting electrons generated by the electrochemical reaction of the internal electrode active material 112 and the external electrode active material 132 or supplying electrons necessary for the electrochemical reaction. The internal current collector 111 and the external current collector 131 may be made of metal such as copper or aluminum. In addition, the battery cell 100 may be formed to be flexible so that it may be freely deformed, and for this, a conductive polymer such as polypyrrole may be used as the current collector. However, the material of the current collector is not limited to metal or polypyrrole.

Meanwhile, the battery cell 100 may include a protection coating 160. The protection coating 160 is an insulating material and may be made of a general polymer resin, for example PVC, HDPE or epoxy resin.

The protection circuit module 200 is electrically connected to the battery cell 100 in various ways to protect the battery cell 100. For example, the protection circuit module 200 is electrically connected to the battery cell 100 to perform various protecting operations, for example by preventing at least one of overcharge and overdischarge of the battery cell 100 or preventing the overcurrent from flowing into the battery cell 100. The protection circuit module 200 may also measure a voltage of the battery cell 100. Here, the protection circuit module 200 measures the voltage of the battery cell 100 and then blocks the charging current or the discharging current if an abnormal voltage is generated during charging or discharging.

The protection circuit module 200 may be an end-connecting protection circuit module 210. Referring to FIG. 3, the end-connecting protection circuit module 210 is connected to one end of the battery cell 100. That is, the end-connecting protection circuit module 210 is electrically connected to the first wire 140 and the second wire 150 formed at one end of the battery cell 100. If the connection portion of the wires 140, 150 of the battery cell 100 and the end-connecting protection circuit module 210 is exposed to the outside, an electric short circuit may be generated. Thus, as shown in FIG. 4, an insulation member 300 may be provided to surround the end-connecting protection circuit module 210 in order to insulate the end-connecting protection circuit module 210. That is, if an adhesive such as a hot melt is used without using a case, the end-connecting protection circuit module 210 may be insulated while reducing volume and weight, thereby preventing an electric short at the connecting portion of the wires 140, 150 and the end-connecting protection circuit module 210. However, if the end-connecting protection circuit module 210 may be insulated without using the insulation member 300, the insulation member 300 may be omitted. In addition, the insulation member 300 may not only prevent an electric short at the connecting portion of the wires 140, 150 and the end-connecting protection circuit module 210 but also give a waterproof effect or a dustproof effect thereto. However, the insulation member 300 is not limited to the hot melt, and various materials such as various composite resins may be used as long as the connection portion of the wires 140, 150 and the end-connecting protection circuit module 210 may be insulated. Meanwhile, the insulation member may be coupled not only to the end-connecting protection circuit module 210 but also to the other end of the battery cell 100 as an insulation member 310 that is not coupled with the end-connecting protection circuit module 210 to provide an insulation, waterproof or dustproof function thereto.

Hereinafter, the operation and effect of the cable-type battery 10 according to the first embodiment of the present disclosure will be described with reference to the drawings.

The cable-type battery 10 having a long length may be provided so that the battery may be used for various purposes. The cable-type battery 10 includes a cable-type battery cell 100 and a protection circuit module 200 coupled to the battery cell 100 to prevent overcharge and overdischarge of the battery cell 100. Here, the battery cell 100 is formed to be flexible so as to be bent in various directions, and the end-connecting protection circuit module 210 may be coupled to one end thereof. In addition, the insulation member 300 such as a hot melt, which may be used instead of a case, may be coupled to the end-connecting protection circuit module 210, and by doing so, the connection portion of the wires 140, 150 and the end-connecting protection circuit module 210 may be insulated.

Figure 5:
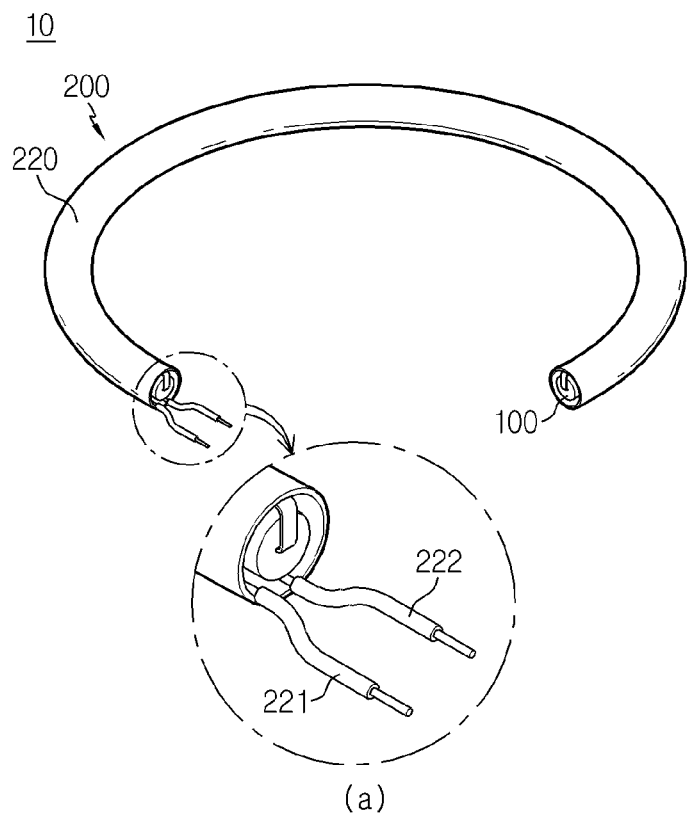
FIGS. 5(a) and 5(b) are schematic perspective views showing that the protection circuit module accommodates the battery cell at the cable-type battery according to the second embodiment of the present disclosure.
Figure 5:
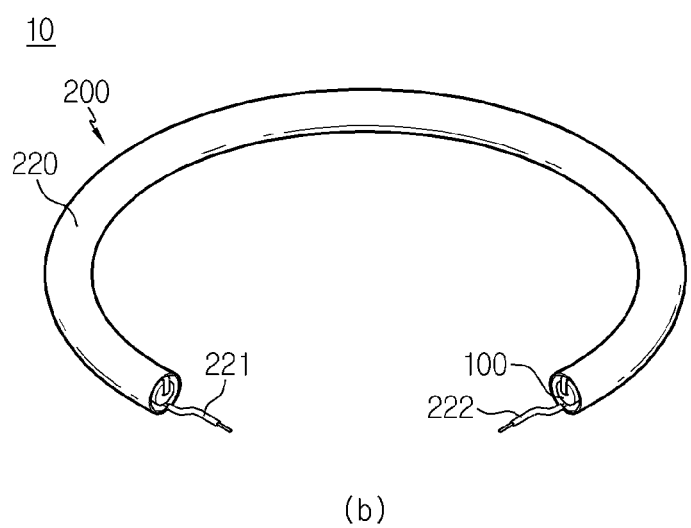

FIGS. 5(a) and 5(b) are schematic perspective views showing that the protection circuit module accommodates the battery cell at the cable-type battery according to the second embodiment of the present disclosure.

Hereinafter, the operations and effects of the cable-type battery 10 according to the second embodiment of the present disclosure will be described with reference to the drawings. However, the same feature as described in relation to the cable-type battery 10 according to the first embodiment of the present disclosure will not be described in detail again.

The second embodiment of the present disclosure is different from the first embodiment where the end-connecting protection circuit module 210 is provided, in the point that an accommodating protection circuit module 220 is provided.

The protection circuit module 200 is provided as an accommodating protection circuit module 220, and referring to FIGS. 5(a) and 5(b), the accommodating protection circuit module 220 is provided to accommodate the battery cell 100. Here, FIG. 5(a) shows a case where both wires 221, 222 connected to the positive electrode and the negative electrode of the battery cell 100 are formed at one end of the accommodating protection circuit module 220, and FIG. 5(b) shows a case where the wires 221, 222 connected to the positive electrode and the negative electrode of the battery cell 100 are respectively formed at both ends of the accommodating protection circuit module 220.

The accommodating protection circuit module 220 may be provided as a flexible board such as a flexible printed circuit board (FPCB) to surround the periphery of the battery cell 100. That is, the accommodating protection circuit module 220 may be manufactured by rolling a spread flexible board into a round shape to surround the periphery of the battery cell and then coupling the ends of the flexible board to each other by bonding and hot-melting. If the flexible board surrounds the battery cell 100 as described above, when the battery cell 100 is bent, the flexible battery 100 is bent together in association with the battery cell. For this reason, the advantage that the battery cell 100 is bent may be fully utilized.

In addition, since the flexible board surrounds the battery cell 100, the flexible board may not only protect the battery cell 100 from an external physical impact but also be insulated.

Meanwhile, various types of circuit components are mounted to the accommodating protection circuit module 220 including the flexible board. Here, if the circuit components are exposed to the outside, even though the battery cell 100 may be protected from a physical impact, the circuit components mounted to the accommodating protection circuit module 220 may be damaged. In order to prevent the circuit components from being damaged, the circuit components may be mounted inside the accommodating protection circuit module 220. That is, in a state where the flexible board of the accommodating protection circuit module 220 surrounds the battery cell 100, the circuit components may be located at the inside of the accommodating protection circuit module 220 in which the battery cell 100 is disposed, thereby preventing the circuit components from being damaged due to an external impact or the like.

However, the present disclosure does not exclude the case where circuit components are mounted at the outside. If the circuit components are mounted at the outside of the accommodating protection circuit module 220, the accommodating protection circuit module 220 may be sealed or insulated with an insulating sheet or the like.

In addition, the positive electrode terminal and the negative electrode terminal of the battery cell 100 may be coupled to the accommodating protection circuit module 220 by various welding methods, for example spot welding, soldering, laser welding, or the like.

Meanwhile, a battery pack (not shown) according to an embodiment of the present disclosure may include one or more cable-type batteries 10 according to an embodiment of the present disclosure as described above. Also, in addition to the cable-type battery 10, the battery pack (not shown) may further include a case for accommodating the cable-type battery 10, and the like.

Meanwhile, a device according to an embodiment of the present disclosure may include the cable-type battery 10 or the battery pack (not shown) as described above, and the battery pack (not shown) may include the cable-type battery 10. In addition, the device (not shown) may include various machines, devices, tools, instruments, and the like, for example an emergency power supply, a computer room power supply, a portable power supply, a medical equipment power supply, a fire-fighting equipment power supply, an alarming equipment power supply, or an evacuation facility power supply. Here, the cable-type battery 10 or the battery pack (not shown) described above may be used as a power source for the device (not shown). In particular, the device (not shown) according to an embodiment of the present disclosure may be a commercially available wearable device, which may include a variety of tools capable of conforming to the curve of the body such as a neckband, a wristband and a ring, and may include various kinds of earphones and the like. That is, the cable-type battery 10 or the battery pack (not shown) may be used as a power source of various wearable devices such as neckband-type devices, wristband-type devices, ring-type devices and various earphones, and various kinds of earphones.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a cable-type battery and is particularly applicable to an industry related to a secondary battery.

What is claimed is:
1. A cable-type battery, comprising:
a cable-type battery cell including an internal electrode including at least one internal electrode layer having an internal electrode active material formed on a surface of an internal current collector extending in a longitudinal direction to have a cross section of a preset shape, a separation layer formed to surround the at least one internal electrode layer, and an external electrode including an external electrode layer formed to surround the separation layer and having an external electrode active material formed on a surface of an external current collector; and
a protection circuit module electrically connected to the battery cell to protect the battery cell, wherein wires respectively connected to the internal electrode and the external electrode are formed at one end of the protection circuit module or are respectively formed at opposing ends of the protection circuit module,
wherein the protection circuit module includes an accommodating protection circuit module,
wherein the accommodating protection circuit module is provided to accommodate the battery cell,
wherein the accommodating protection circuit module is provided as a flexible board to surround a periphery of the battery cell, and
wherein a circuit component is mounted between the accommodating protection circuit module and the battery cell to an inside of the accommodating protection circuit module.
2. The cable-type battery according to claim 1, wherein the battery cell is formed to be flexible.
3. A battery pack, comprising a cable-type battery according to claim 1.
4. A device, comprising a cable-type battery according to claim 1.
5. The cable-type battery according to claim 1, wherein the flexible board is a flexible printed circuit board.
6. The cable-type battery according to claim 1, wherein the flexible board is in a round shape to surround the periphery of the battery cell, and ends of the flexible board are coupled to each other.

* * * * *